(12) United States Patent
Otani et al.

(10) Patent No.: US 6,209,079 B1
(45) Date of Patent: Mar. 27, 2001

(54) PROCESSOR FOR EXECUTING INSTRUCTION CODES OF TWO DIFFERENT LENGTHS AND DEVICE FOR INPUTTING THE INSTRUCTION CODES

(75) Inventors: Sugako Otani; Shunichi Iwata, both of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/562,643

(22) Filed: May 1, 2000

Related U.S. Application Data

(63) Continuation of application No. 08/811,005, filed on Mar. 4, 1997.

(30) Foreign Application Priority Data

Sep. 13, 1996 (JP) .................................................. 8-243375

(51) Int. Cl.⁷ ....................................................... G06F 9/30
(52) U.S. Cl. ............................................................ 712/210
(58) Field of Search ................................... 712/204, 205, 712/210

(56) References Cited

U.S. PATENT DOCUMENTS

| | | | |
|---|---|---|---|
| 3,678,467 | * 7/1972 | Nussbaum | 712/208 |
| 4,250,548 | * 2/1981 | Kindell | 712/300 |
| 4,408,271 | * 10/1983 | Kindell | 712/300 |
| 4,447,878 | * 5/1984 | Kimie et al. | 710/127 |
| 4,502,115 | * 2/1985 | Eguchi | 710/127 |
| 5,117,488 | 5/1992 | Noguchi et al. | 712/210 |
| 5,452,423 | 9/1995 | Picard et al. | 712/210 |
| 5,701,437 | * 12/1997 | Kinjo et al. | 711/162 |

FOREIGN PATENT DOCUMENTS

| | | |
|---|---|---|
| 1-119828 | 5/1989 | (JP) . |
| 4-15826 | 1/1992 | (JP) . |
| 5-313894 | 11/1993 | (JP) . |

* cited by examiner

*Primary Examiner*—David Y. Eng
(74) *Attorney, Agent, or Firm*—Burns, Doane, Swecker & Mathis, LLP

(57) ABSTRACT

For a processor having instruction codes of two instruction lengths (16 bits and 32 bits), methods of locating the instruction codes are limited to two types: (1) two 16-bit instruction codes are stored within 32-bit word boundaries, and (2) a single 32-bit instruction code is stored intactly within the 32-bit word boundaries. A branch destination address is specified only on the 32-bit word boundary. The MSB of each instruction code serves as a 1-bit instruction length identifier for controlling the execution sequence of the instruction codes. This provides two transfer paths from an instruction fetch portion to an instruction decode portion within the processor, achieving reduction in code side and in the amount of hardware and, accordingly, the increase in operating speed.

2 Claims, 17 Drawing Sheets

FIG. 8

| mnemonic | Function | Format |
|---|---|---|
| LD | Load | 0010 dest 1100 src |
| | | 0010 dest 1110 src |
| | | 1010 dest 1100 src  displ6 |
| LD | Load byte | 0010 dest 1000 src |
| | | 1010 dest 1000 src  displ6 |
| LDUB | Load unsigned byte | 0010 dest 1001 src |
| | | 1010 dest 1001 src  displ6 |
| LDH | Load halfword | 0010 dest 1010 src |
| | | 1010 dest 1010 src  displ6 |
| LDUH | Load unsigned halfword | 0010 dest 1011 src |
| | | 1010 dest 1011 src  displ6 |
| LOCK | Load locked | 0010 dest 1101 src |
| ST | Store | 0010 src1 0100 src2 |
| | | 0010 src1 0110 src2 |
| | | 0010 src1 0111 src2 |
| | | 1010 src1 0100 src2 displ6 |
| STB | Store byte | 0010 src1 0000 src2 |
| | | 1010 src1 0000 src2 |
| STH | Store halfword | 0010 src1 0010 src2 |
| | | 0010 src1 0010 src2 displ6 |
| UNLOCK | Store unlocked | 0010 src1 0101 src |
| LD24 | Load 24-bit immediate | 1110 dest      imm24 |
| LDI | Load immediate | 0110 dest imm8 |
| | | 1001 dest 1111 0000 imm16 |
| MV | Move register | 0001 dest 1000 src |
| MVFC | Move from control register | 0001 dest 1001 src |
| MVTC | Move to control register | 0001 dest 1010 src |
| SETH | Set high-order 16-bit | 1101 dest 1100 0000 imm16 |
| CMP | Compare | 0000 src1 0100 src2 |
| CMPI | Compare immediate | 1000 0000 0100 src  imm16 |
| CMPU | Compare unsigned | 0000 src2 0101 src2 |
| CMPUI | Compare Unsigned immediate | 1000 0000 0101 src  imm16 |
| ADD | Add | 0000 dest 1010 src |
| ADD3 | Add 3-operand | 1000 dest 1010 src  imm16 |
| ADDI | Add immediate | 0100 dest      imm8 |
| ADDV | Add(with overflow checking) | 0000 dest 1000 src |
| ADDV3 | Add 3-operand(with overflow checking) | 1000 dest 1000 src imm16 |
| ADDX | Add with carry | 0000 dest 1001 src |
| NEG | Negate | 0000 dest 0011 src |
| SUB | Subtract | 0000 dest 0010 src |
| SUBV | Subtract(with overflow checking) | 0000 dest 0000 src |
| SUBX | Subtract with borrow | 0000 dest 0001 src |

| Mnemonic | Description | Encoding |
|---|---|---|
| AND | AND | 0000 dest 1100 src |
| AND3 | AND 3-operand | 1000 dest 1100 src   imm16 |
| NOT | Logical NOT | 0000 dest 1011 src |
| OR | OR | 0000 dest 1110 src |
| OR3 | OR 3-operand | 1000 dest 1110 src   imm16 |
| XOR | Exclusive OR | 0000 dest 1101 src |
| XOR3 | Exclusive OR 3-operand | 1000 dest 1101 src   imm16 |
| | | |
| DIV | Divide | 1001 dest 0000 src 0000 0000 0000 0000 |
| DIVU | Divide unsigned | 1001 dest 0001 src 0000 0000 0000 0000 |
| MUL | Multiply | 0001 dest 0110 src |
| REM | Remainder | 1001 dest 0010 src 0000 0000 0000 0000 |
| REMU | Remainder unsigned | 1001 dest 0011 src 0000 0000 0000 0000 |
| SLL3 | Shift left logical 3-operand | 1001 dest 1100 src   imm16 |
| SLLI | Shift left logical immediate | 0101 dest010 imm5 |
| SRA | Shift right arithmetic | 0001 dest 0010 src |
| SRA3 | Shift right arithmetic 3-operand | 1001 dest 1010 src   imm16 |
| SRAI | Shift right arithmetic Immediate | 0101 dest 001 imm5 |
| SRL | Shift right logical | 0001 dest 0000 src |
| SRL3 | Shift right logical 3-operand | 1001 dest 1000 src   imm16 |
| SRLI | Shift right logical Immediate | 0101 dest 000  imm5 |
| | | |
| BC | Branch on C-bit | 0111 1100 pcdisp8 |
| | | 1111 1100          pcdisp24 |
| BEQ | Branch on equal | 1011 src1 0000 src2     pcdisp16 |
| BEQZ | Branch on equal zero | 1011 0000 1000 src      pcdisp16 |
| BGEZ | Branch on greater than or equal zero | 1011 0000 1011 src      pcdisp16 |
| BGTZ | Branch on greater than zero | 1011 0000 1101 src      pcdisp16 |
| BL | Branch and link | 0111 1110 pcdisp8 |
| | | 1111 1110          pcdisp24 |

```
BLEZ  Branch on less than or equal zero       1011 0000 1100 src       pcdisp16
BLTZ  Branch on less than zero                1011 0000 1010 src       pcdisp16
BNC   Branch on not C-bit                     0111 1101 pcdisp8
                                              1111 1101          pcdisp24
BNE   Branch on not equal                     1011 src1 0001 src2      pcdisp16
BNEZ  Branch on not equal zero                1011 0000 1001 src       pcdisp16
BRA   Branch ────BL2                          0111 1111 pcdisp8
                                              1111 1111          pcdisp24

JL    Jump and link                           0001 1110 1100 src
JMP   Jump                                    0001 1111 1100 src
NOP   No operation                            0111 0000 0000 0000

RTE   Return from Interruput,Trap             0001 0000 1101 0110
TRAP  Trap                                    0001 0000 1111 imm4

MACHI    Multiply-accumulate high-order halfwords              0011 src1 0100 src2
MACLO    Multiply-accumulate low-order halfwords               0011 src1 0101 src2
MACWHI   Multiply-accumulate word and high-order halfwords     0011 src1 0110 src2
MACWLO   Multiply-accumulate word and low-order halfwords      0011 src1 0111 src2
MULHI    Multiply high-order halfwords                         0011 src1 0000 src2
MULLO    Multiply low-order halfwords                          0011 src1 0001 src2
MULWHI   Multiply word and high-order halfwords                0011 src1 0010 src2
MULWLO   Multiply word and low-order halfwords                 0011 src1 0011 src2
MVFACHI  Move from accumulator high-order word                 0101 src  1111 0000
MVFACLO  Move from accumulator low-order word                  0101 src  1111 0001
MVFACMI  Move from accumulator middle-order word               0101 src  1111 0010
MVTACHI  Move to accumulator high-order word                   0101 src  0111 0000
MVTACLO  Move to accumulator low-order word                    0101 src  0111 0001
RAC      Round accumulator                                     0101 0000 1001 0000
RACH     Round accumulator halfword                            0101 0000 1000 0000
```

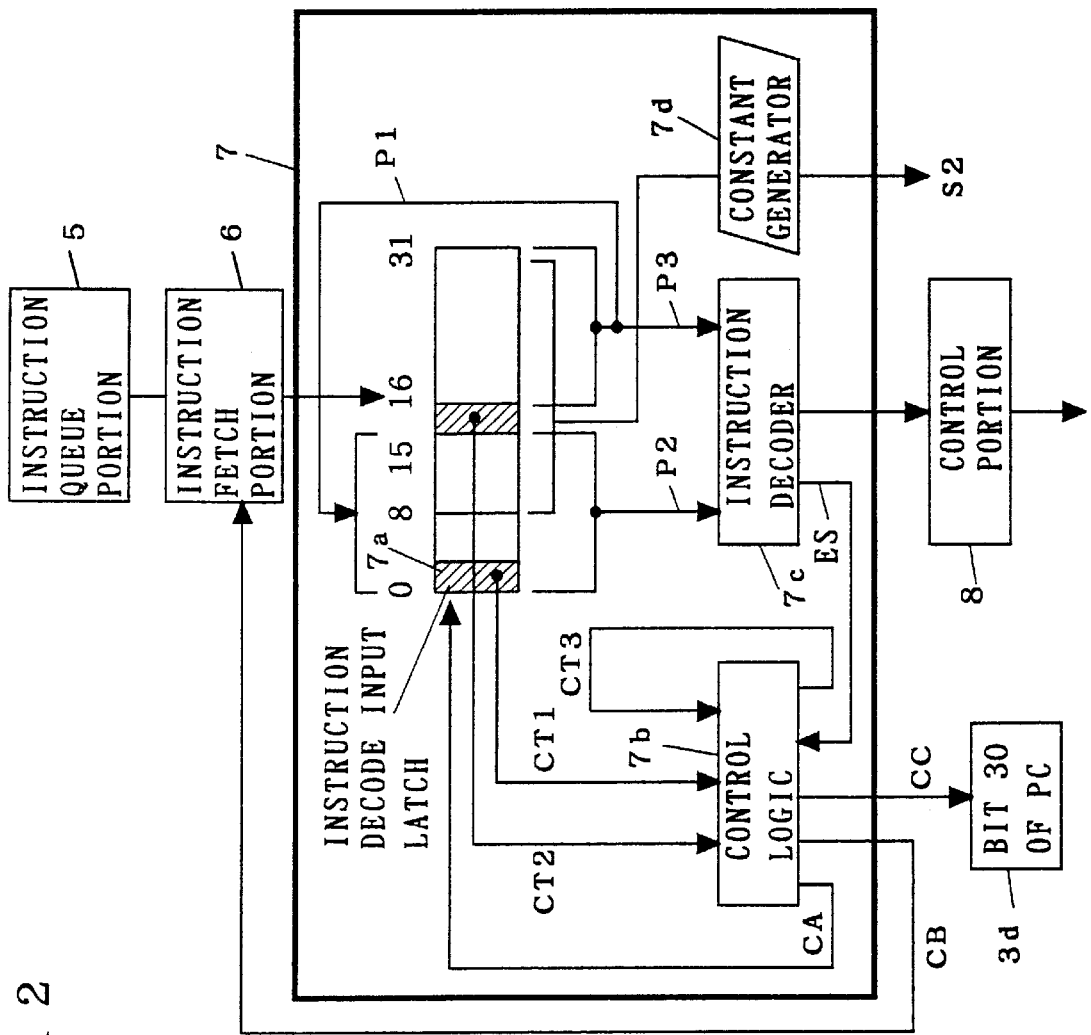
F I G. 1 2

FIG. 13

| FIRST CONTROL SIGNAL CT1 | SECOND CONTROL SIGNAL CT2 | THIRD CONTROL SIGNAL CT3 | 0 ... 15 | 16 ... 31 |
|---|---|---|---|---|
| 0 | 0 | 0 | 0 16-BIT INSTRUCTION A | 0 16-BIT INSTRUCTION B |
| 0 | 0 | 1 | 0 16-BIT INSTRUCTION A | 0 16-BIT INSTRUCTION B |
| 0 | 1 | * | 0 16-BIT INSTRUCTION A | 1111 0000 0000 0000 |
| 1 | * | * | 1 32-BIT INSTRUCTION | |

F I G. 14

| BRANCH | INPUTS | | | SHIFTER CONTROL | 32-BIT BOUNDARY POINTER | POSITION OF NEXT CODE | BIT 30 OF PC |
|---|---|---|---|---|---|---|---|
| | CT1 | CT2 | CT3 | CA | CB | CT3 | CC |
| NOT CAUSED | 0 | 0 | 0 | SHIFTED | UPDATED | LOW-ORDER 16-BITS | 0 |
| | 0 | 0 | 1 | NOT SHIFTED | NOT UPDATED | HIGH-ORDER 16-BITS | 1 |
| | 0 | 1 | * | NOT SHIFTED | NOT UPDATED | HIGH-ORDER 16-BITS | 0 |
| | 1 | * | * | NOT SHIFTED | UPDATED | HIGH-ORDER 16-BITS | 0 |
| CAUSED | * | * | * | NOT SHIFTED | INITIALIZED | 0 | 0 |

PROCESSOR FOR EXECUTING INSTRUCTION CODES OF TWO DIFFERENT LENGTHS AND DEVICE FOR INPUTTING THE INSTRUCTION CODES

This application is a continuation of application Ser. No. 08/811,005, filed Mar. 4, 1997.

BACKGROUND OF THE INVENTION

1. Field of the Invention

The present invention relates to a data processor for executing an operation of a plurality of instruction codes and, more particularly, to a technique for locating instruction codes in a processor.

2. Description of the Background Art

Conventionally, instructions are stored as instruction codes in a memory connected to a processor through a data bus. The formats of the instruction codes stored in the memory are of two types: (1) a "fixed length instruction format" in which a constantly fixed instruction code length is set independently of instruction types, and (2) an "instruction format having an variable length" (referred to hereinafter as an variable length instruction format) in which different instruction code lengths are set depending upon the instruction types.

The instruction code has an operation code part for specifying the functions of the instructions such as operation, transfer, branch, and the like, and an operand code field for specifying the data on which the instruction is to be executed (operand). The operand is specified such that an addressing mode specifying part in the instruction code specifies whether the operand is located in a register or in an external memory. If the operand is located in the memory, address information is added to the contents of the instruction code.

FIGS. 18 and 19 schematically illustrate the fixed length instruction format and the variable length instruction format, respectively. In FIGS. 18 and 19, an instruction format 100 is the fixed length instruction format when the operand is absent, an instruction format 101 is the fixed length instruction format when the operand is present, an instruction format 102 is the variable length instruction format when the operand is absent, and an instruction format 103 is the variable length instruction format when the operand is present.

(1) Instruction Code Having Fixed Length Instruction Format

The instruction code having the fixed length instruction format is advantageous in easy decoding. However, the fixed length instruction format is restricted such that the operation code, the addressing mode specifying part, and additional information such as address information must be contained within a determined fixed instruction length range. Thus, storage of more additional information requires a greater instruction length. Consequently, the fixed length instruction format having the greater instruction length increases redundant portions in an instruction bit pattern, resulting in increased code size. On the other hand, a decreased instruction length for code size reduction results in severer restrictions on instruction functions.

(2) Instruction Code Having Variable Length Instruction Format

The instruction code having the variable length instruction format is advantageous in that the instruction functions may be expanded depending upon the instructions because of the use of the instruction formats of two or more arbitrary instruction lengths. Additionally, the instructions having no operand may be of a short length to permit the code size to be smaller than that for the fixed length instruction format.

On the other hand, the extraction of data read from a memory as instruction codes and decoding the instruction codes are complicated, resulting in a complicated instruction decoding method. This increases the amount of hardware for extracting the instruction codes from the contents of the memory to feed the extracted instruction codes to an instruction decoder. With reference to FIG. 20, for example, the introduction of a 16-bit instruction format 105 and a 32-bit instruction format 104 as the variable length instruction formats involves the need to provide four paths for transferring the instruction code between an instruction fetch portion and an instruction decoder as illustrated in FIG. 21. For this purpose, the instruction decoder must have a complicated shift function so that an effective instruction code is shifted and decoded, with the instruction code properly located.

As above described, (1) the fixed length instruction format and (2) the variable length instruction format have advantages and drawbacks. The achievement of a processor having the advantages of both the fixed length instruction format and the variable length instruction format has been desired.

SUMMARY OF THE INVENTION

According to a first aspect of the present invention, a processor comprises: instruction code input means having instruction codes consisting of first instruction data signals indicative of an N-bit instruction (where N is an integer not less than 1) and second instruction data signals indicative of a 2N-bit instruction, the instruction codes of the first and second instruction data signals being located under such rules that two of the first instruction data signals are stored within 2N-bit word boundaries and that each of the second instruction data signals is stored within the 2N-bit word boundaries; and instruction fetch means for fetching the instruction code input means to hold the instruction codes located under the rules.

Preferably, according to a second aspect of the present invention, the processor of the first aspect of the present invention further comprises: instruction decoding means for receiving data signals indicative of the instruction codes transferred from the instruction fetch means to restrictively specify a branch destination address for the instruction codes only on the 2N-bit word boundaries, thereby to decode the instruction codes.

Preferably, according to a third aspect of the present invention, in the processor of the second aspect of the present invention, low-order two bits of the branch destination address are constantly "00".

Preferably, according to a fourth aspect of the present invention, in the processor of the second aspect of the present invention, each of the first and second instruction data signals has instruction length identifier indicative of control information of an instruction execution sequence at a predetermined bit position thereof.

Preferably, according to a fifth aspect of the present invention, in the processor of the fourth aspect of the present invention, the instruction decoding means comprises: an instruction decode input latch for storing the instruction code data signals transferred from the instruction fetch means with a width of 2N bits; an instruction decoder for receiving and decoding at least one instruction code data signal indicative of an effective instruction code among the instruction code data signals stored in the instruction decode input latch; and a control logic for controlling the transfer of the effective instruction code from the instruction decode input latch to the instruction decoder on the basis of the instruction length identifier indicated by the instruction code data signals stored in the instruction decode input latch.

Preferably, according to a sixth aspect of the present invention, in the processor of the fifth aspect of the present invention, the control logic controls the instruction decode input latch in such a manner that: when the instruction length identifier indicate that the instruction code data signals stored in the instruction decode input latch are the second instruction data signals, the control logic directly transfers the second instruction data signals from the instruction decode input latch to the instruction decoder; and when the instruction length identifier indicate that the instruction code data signals stored in the instruction decode input latch are two of the first instruction data signals which are effective, the control logic transfers one of the two first instruction data signals which is located in a high-order bit position from the instruction decode input latch to the instruction decoder, and then shifts the remainder of the two first instruction data signals which is located in a low-order bit position to the high-order bit position in which the former first instruction data signal has been located to transfer the shifted first instruction data signal from the instruction decode input latch to the instruction decoder.

Preferably, according to a seventh aspect of the present invention, in the processor of the sixth aspect of the present invention, when the instruction length identifier indicate that the instruction code data signals stored in the instruction decode input latch are two of the first instruction data signals and that one of the two first instruction data signals which is located in the low-order bit position is an instruction for word alignment control, the control logic performs control so as not to execute the decoding of the one first instruction data signal which is located in the low-order bit position.

Preferably, according to an eighth aspect of the present invention, in the processor of the seventh aspect of the present invention, the instruction decoding means further comprises a constant generator for receiving a data signal indicative of an immediate value from the instruction decode input latch to perform code expansion on the immediate value data signal when the instruction codes stored in the instruction decode input latch specify the branch destination address by using the immediate value.

Preferably, according to a ninth aspect of the present invention, the processor of the second aspect of the present invention further comprises control means for accepting interrupt requests made by an external interrupt signal and a PC break interrupt signal generated when a specific address is executed only on the 2N-bit word boundaries of the instruction codes to control processing of the processor so that processing corresponding to the interrupt requests is executed.

Preferably, according to a tenth aspect of the present invention, the processor of the second aspect of the present invention further comprises control means for controlling the instruction decoding means to cause the instruction decoding means to decode a trap instruction and to control processing of the processor so that processing corresponding to the trap instruction is executed when the instruction codes located within the 2N-bit word boundaries are the trap instruction which gives directions for execution of an interrupt controlled by software.

An eleventh aspect of the present invention is intended for an instruction code input device for applying instruction codes to a processor. According to the present invention, the instruction codes consist of first instruction data signals indicative of an N-bit instruction (where N is an integer not less than 1) and second instruction data signals indicative of a 2N-bit instruction, the instruction codes of said first and second instruction data signals being located under such rules that two of the first instruction data signals are stored within 2N-bit word boundaries and that each of the second instruction data signals is stored within the 2N-bit word boundaries.

In accordance with the first to tenth aspects of the present invention, the instruction code input means stores the two first instruction data signals and the second instruction data signal within the 2N-bit word boundaries to inhibit the instruction code arrangement which causes 2N-bit instruction data to cross the 2N-bit boundary. This reduces the number of transfer paths of the instruction code data signals from the instruction fetch portion to the instruction decode portion from four as is the case with the background art to three.

Particularly, in accordance with the second aspect of the present invention, the instruction decoding means limits the branch destination address to within the 2N-bit word boundaries, reducing the number of instruction code transfer paths to two.

Additionally, in accordance with the third aspect of the present invention, there is no need to specify the low-order 2 bits when the branch destination address is specified within the instruction code. This increases the range of addresses to which a direct branch is caused from within the instruction code.

In accordance with the fourth aspect of the present invention, decoding the instructions and controlling the sequence of execution thereof are enabled on the basis of the instruction length identifier. Suitable setting of the instruction length identifier does not require the execution of the instruction code data signals for no-operation, thereby eliminating the execution time penalty.

Further, in accordance with the fifth aspect of the present invention, the control logic may control the transfer of the instruction codes from the instruction decode input latch to the instruction decoder on the basis of the instruction length identifier.

In accordance with the sixth aspect of the present invention, the control logic controls the instruction decode input latch in accordance with the indication contents of the instruction length identifier. In particular, when the two first instruction data signals within the 2N-bit word boundaries are effective, the instruction decode input latch may shifts one of the first instruction data signals which is located in the low-order bit position. This reduces the amount of hardware in the instruction decoding means, increasing the operating speeds of the processor.

In accordance with the seventh aspect of the present invention, when one of the two first instruction data signals which is located in the low-order bit position is inserted as the instruction for word alignment control, the control logic performs control so that the decoding of the first instruction data signal which is located in the low-order bit position is not executed, eliminating the execution time penalty and reducing the entire execution time.

In accordance with the eighth aspect of the present invention, the provision of the constant generator permits the processor to perform processing when the branch destination address is specified by the immediate value in the instruction code, such as a BRA instruction and a BEG instruction.

The ninth aspect of the present invention may additionally provide the function of supporting the external interrupt and the PC break interrupt.

The tenth aspect of the present invention may additionally provide the function of supporting the trap instruction.

In accordance with the eleventh aspect of the present invention, with the two first instruction data signals and the second instruction data signal stored within the 2N-bit word boundaries, the instruction code input device may sequentially input the 2N-bit instruction code data signals under the restriction of the arrangement of the instruction codes to the processor. This allows the processor which receives the instruction code data signals to reduce the number of transfer paths for instruction decoding from four as is the case with the background art to three.

It is a primary object of the present invention to provide a processor and an input device for a processor which have an instruction format that is smaller in code size than a fixed length instruction format and that requires a smaller amount of processor hardware than a conventional variable length instruction format to increase the operating speed.

It is another object of the present invention to provide a processor having the functions of various interrupts (an external interrupt, a PC break interrupt, and the like) caused during the execution of instructions, and a software interrupt.

It is still another object of the present invention to embody a construction of a processor for decoding such instruction codes.

These and other objects, features, aspects and advantages of the present invention will become more apparent from the following detailed description of the present invention when taken in conjunction with the accompanying drawings.

BRIEF DESCRIPTION OF THE DRAWINGS

FIGS. 8, 9 and 10 illustrate an instruction code table of a processor;

FIG. 12 is a detailed block diagram of the instruction decode portion;

FIG. 13 illustrates the relationship between first to third control signals and the arrangement of effective codes in an instruction decode input latch;

FIG. 14 illustrates the relationship between the first to third control signals and fourth to sixth control signals for a control logic of the instruction decode portion;

DESCRIPTION OF THE PREFERRED EMBODIMENTS

First Preferred Embodiment

A preferred embodiment according to the present invention will now be described on the assumption that N=16 where N is an integer equal to or greater than 1, with reference to the drawings.

Figure 1:
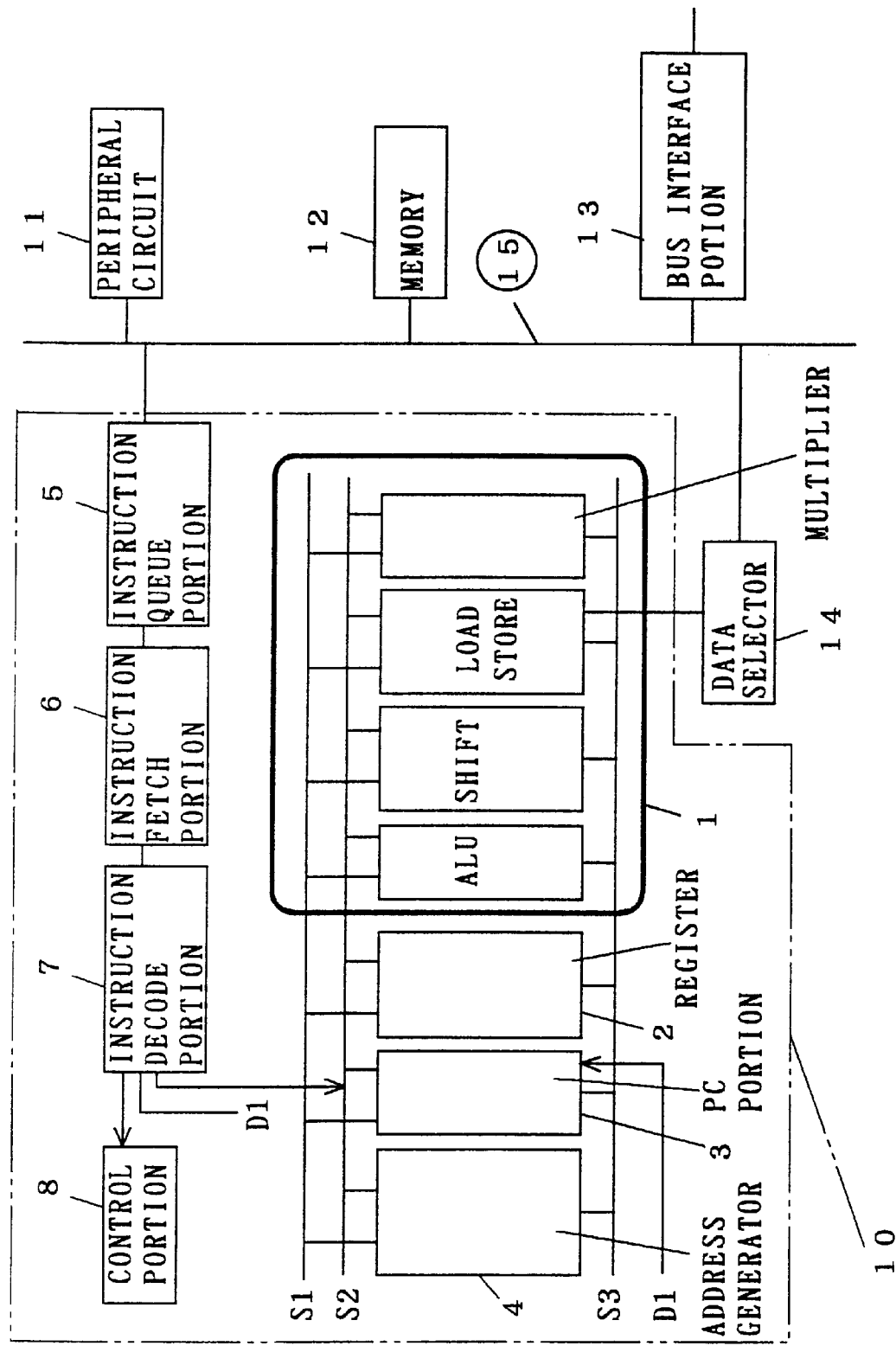
FIG. 1 is a block diagram of a data processor according to the present invention.

FIG. 1 is a block diagram of a data processor for executing a plurality of operations according to the present invention. As illustrated in FIG. 1, the data processor comprises a processor 10 as the nucleus.

The processor 10 comprises an arithmetic portion 1, a register 2, a program counter portion (referred to hereinafter as a PC portion) 3, an address generator 4, an instruction queue portion 5, an instruction fetch portion 6, an instruction decode portion 7, and a control portion 8. The control portion 8 controls the operations of the respective portions 1 to 7 in the processor 10 in accordance with the decode result outputted from the instruction decode portion 7. For purposes of simplification, control signals outputted from the control portion 8 are not shown in FIG. 1. The arithmetic portion 1 includes an ALU (arithmetic and logic unit), a shifter, a load-store unit, and a multiplier. The register 2 is a general-purpose register having 16 signal lines with a 32-bit width and for holding arithmetic result data and address data. The details of other portions will be described later.

The instruction queue portion 5 and the instruction fetch portion 6 are generically defined as an "instruction fetch function portion".

The processor 10 is connected to an external peripheral circuit 11, a memory 12, and a data selector 14 by a data bus 15 and a bus interface portion 13. The data bus 15 corresponds to an "input portion" for applying an instruction code data signal indicative of an instruction code to the processor 10.

I. Method of Locating Instruction Codes (Instruction Set)

Description will be given on a method of locating instruction codes which is a principal feature of the present invention.

As above described, (1) the fixed length instruction format and (2) the variable length instruction format have both advantages and drawbacks. Particularly, the use of two types of instruction codes, that is, a 16-bit instruction code and a 32-bit instruction code in the variable length instruction format requires four transfer paths between the instruction fetch portion (or the instruction queue portion) and the instruction decode portion. The factor that creates the serious problem of complicated hardware is, in particular, that the arrangement of instruction codes such that the 32-bit (2N-bit) instruction extends beyond a 32-bit (2N-bit) boundary is permitted. Such an arrangement is schematically illustrated in FIG. 2.

Figure 2:
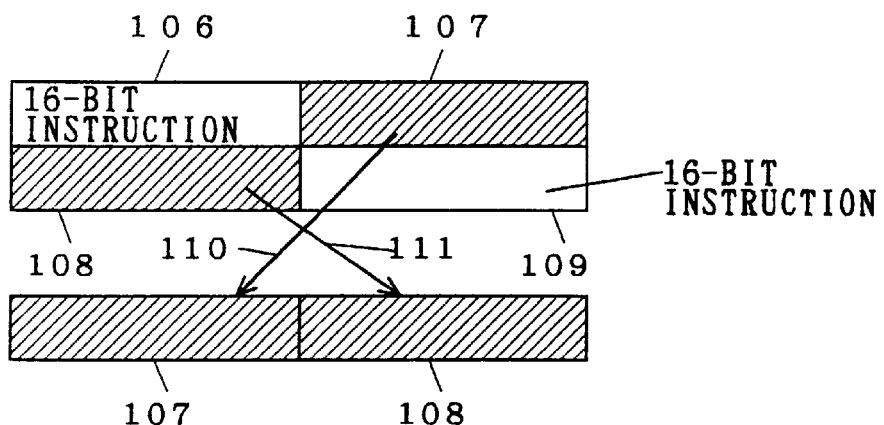
FIGS. 2 and 3 schematically illustrate a method of locating instruction codes.

It is assumed that the instruction fetch portion fetches three instruction codes 106 to 109 arranged in the sequence illustrated in the upper block of FIG. 2 from an external memory and that the 32-bit instruction codes 107 and 108 are effective for data processing. Then, the effective instruction codes 107 and 108 must be located as illustrated in the lower block of FIG. 2 and decoded. It is hence necessary to implement two crossed paths 110 and 111 as shown in FIG. 2. The arrangement of instruction codes which causes such crossed paths is referred to as an "arrangement which causes a 2N-bit instruction to cross a 2N-bit boundary". This inevitably results in complicated hardware associated with the instruction decoder. In the light of the factor, such an arrangement of the instruction codes must be inhibited.

In accordance with the present invention, (i) a plurality of instruction codes (instruction code data signals) are to be executed which are of two instruction lengths, that is, an N-bit instruction (N≧1) (a first instruction data signal) and a 2N-bit instruction (a second instruction data signal), and (ii) the method of locating the instruction codes, or how to locate the instructions within a "word" indicated by 2N bits in length (referred to as "within 2N-bit word boundaries"), is to be restricted to only the following two types:

(1) Two N-bit instructions are stored within the 2N-bit word boundaries.

(2) A single 2N-bit instruction is stored within the 2N-bit word boundaries.

Figure 3:
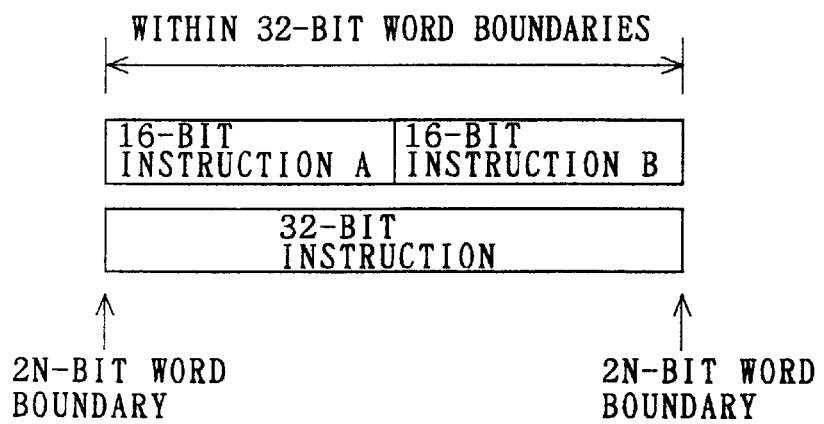

In this preferred embodiment wherein it is assumed that N=16, only the 16-bit instruction and 32-bit instruction (the instruction of a maximum bit length) are to be used, and the method of locating the instruction codes is as illustrated in FIG. 3.

Figure 4:
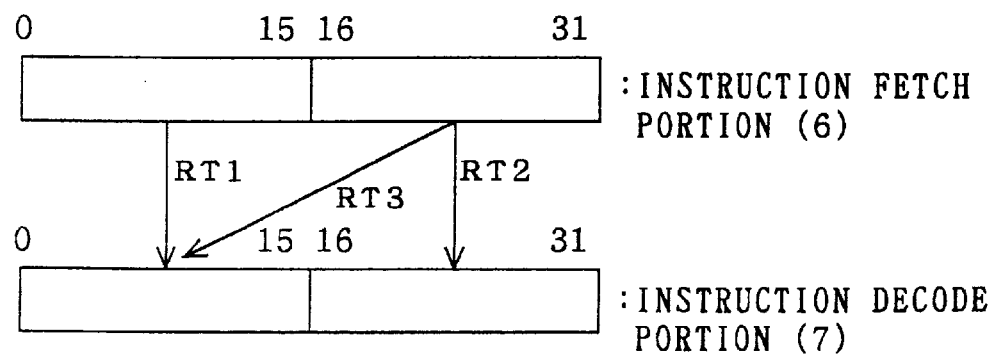
FIG. 4 schematically illustrates transfer paths between an instruction fetch portion and an instruction decode portion.

This restriction of the arrangement completely inhibits the arrangement of the instruction code such that the 32-bit instruction crosses the 32-bit word boundary. Consequently, the transfer paths between the instruction fetch portion 6 and the instruction decode portion 7 of FIG. 1 are reduced to three types as shown in FIG. 4. These three transfer paths will be appreciated from the schematic illustration of FIG. 5.

Figure 5:
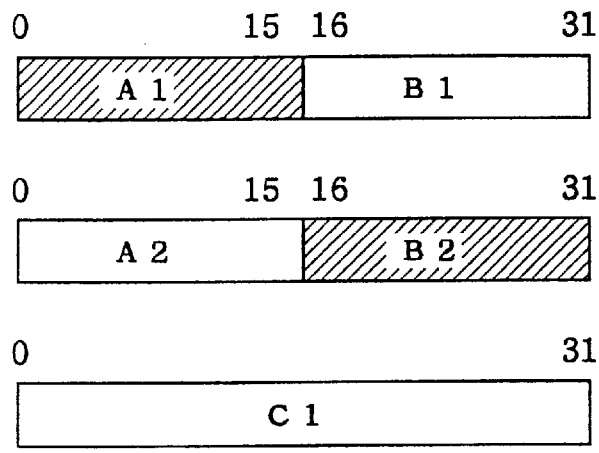
FIG. 5 illustrates three arrangements of instruction codes.

With reference to FIG. 5, there can be three arrangements of instruction codes held in the instruction queue portion 5. The arrangements illustrated in the upper and middle blocks show that a high-order 16-bit instruction code A1 and a low-order 16-bit instruction code B2 are effective, respectively, and are subject to the restriction of the locating method (1). For the arrangement shown in the upper block of FIG. 5, the instruction code A1 is transferred to the decoder via a path RT1 shown in FIG. 4. For the arrangement shown in the middle block of FIG. 5, the instruction code B2 is transferred to the decoder via a crossing path RT3 shown in FIG. 4. The arrangement of a 32-bit instruction code C1 illustrated in the lower block of FIG. 5 is subject to the restriction based on the locating method (2). The 32-bit instruction code C1 is transferred to the decoder via the paths RT1 and RT2 shown in FIG. 4. Thus, only the three paths RT1 to RT3 are required for decoding.

In this manner, the instruction code arrangements are subject to the restrictions (1) and (2). This permits fewer transfer paths by one than the background art transfer paths. The instruction code data signals indicative of the instruction codes located under the restrictions (1) and (2) are implemented as input data signals on the data bus 15 of FIG. 1 and held in the instruction queue portion 5. Hence, the instruction code data are written into the memory 12 by program control based on the restriction rules (1) and (2) in this preferred embodiment. The memory 12 for storing the instruction code data signals written to satisfy the arrangements based on the restriction rules (1) and (2), and the data bus 15 serving as means for applying the instruction code data signals read from the memory 12 in accordance with the arrangement sequence to the processor 10 are generically referred to as an "instruction code input device for processor".

Among the instruction code data signals, the signal indicative of the 16-bit instruction code (generally the N-bit instruction code) located on the basis of the restriction (1) is referred to as a "first instruction code data signal", and the signal indicative of the 32-bit instruction code (generally the 2N-bit instruction code) located on the basis of the restriction (2) is referred to as a "second instruction code data signal".

Figure 6:
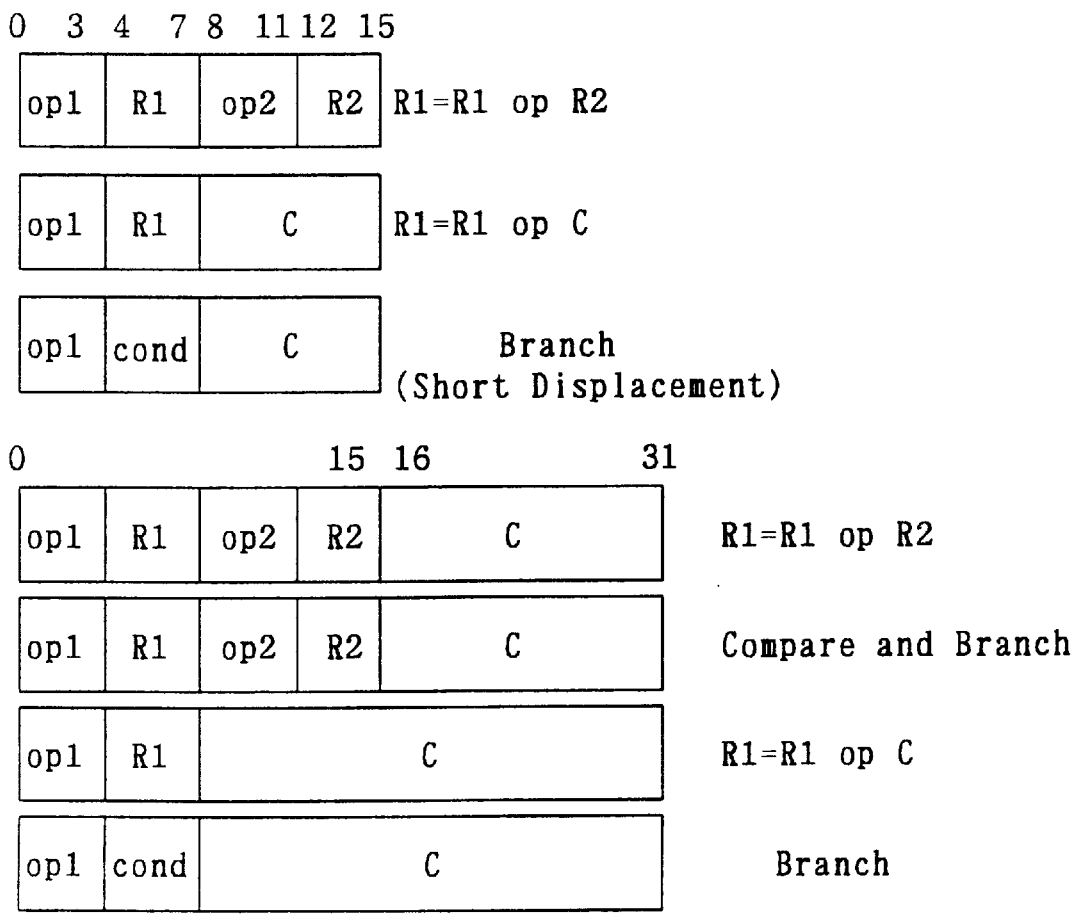
FIG. 6 illustrates formats of instruction code data signals in an instruction queue portion.

FIG. 6 shows the formats of the instruction code data signals in the instruction queue portion 5 of the processor 10. In FIG. 6, the characters op1 and op2 designate operand codes, R1 and R2 designate registers, C designates a constant, and cond designates specified branch conditions.

The instruction code data may be written into the memory 12 independently of the restrictions (1) and (2) in addition to writing the instruction code data into the memory 12 under the restrictions (1) and (2), and a function portion may be provided for locating the instruction code data signals read from the memory 12 on the data bus 15 under the restrictions (1) and (2) to provide output data which in turn are stored in the instruction queue portion 5.

II. Control of Branch Destination

In the processor 10, branch destination addresses are specified on or limited to only the 32-bit boundary. The limitation of the branch destination addresses to only the 32-bit boundary in addition to inhibiting the arrangement of the instruction codes on the 32-bit boundary reduces the transfer paths between the instruction fetch portion 6 and the instruction decoder to two types.

This will be readily understood from the general overview, returning to the illustration of FIG. 5. Specifically, the limitation such that the branch destination addresses are specified only on the 32-bit boundary means that after receiving an instruction code data signal outputted from the instruction fetch portion 6 and located within the 32-bit word boundaries, the instruction decode portion 7 of FIG. 1 starts decoding the instruction code data signal at a leading one of the 32-bit (2N-bit) boundaries. When two 16-bit instruction codes are located within the 32-bit word boundaries, the high-order instruction A2 should be decoded, and thereafter the instruction code B2 illustrated in the middle block of FIG. 5 should be shifted to the bit position of the high-order instruction code A2 and then decoded.

Figure 7:
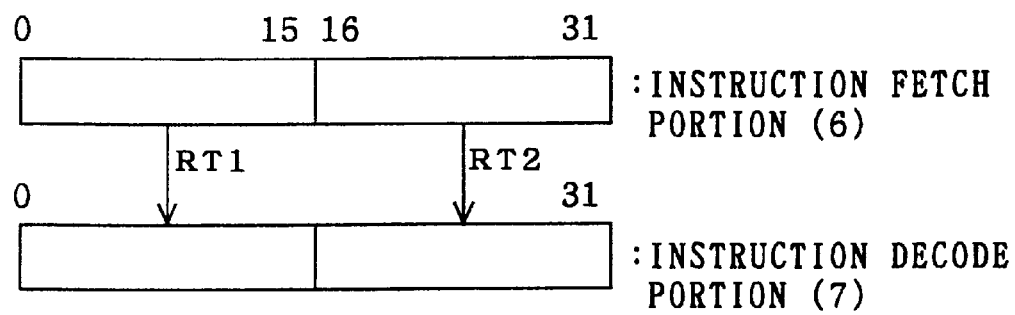
FIG. 7 schematically illustrates transfer paths between the instruction queue portion and the instruction decode portion.

Thus, the transfer paths of the instruction code data signals from the instruction queue portion 5 to the instruction decode portion 7 are limited to two paths as schematically illustrated in FIG. 7. The two transfer paths are as follows:

(A) the instruction queue portion: high-order 16 bits → the instruction decode portion: high-order 16 bits (B) the instruction queue portion: low-order 16 bits → the instruction decode portion: low-order 16 bits The destination of a branch instruction is specified in a form to be described below. Such specification is discussed on the basis of an instruction code table of the processor 10 shown in FIGS. 8, 9 and 10. In the instruction code table of FIGS. 8, 9, and 10, the character "dest" in "Format" designates the number of a register in which the result is stored, and "src" designates an object to be subjected to an operation and means a register R1 shown in FIG. 6 herein. The numerical value in the register R1 is an address value of the memory. The character "pcdisp8" indicates that an immediate value is represented by 8 bits.

In the instruction code table,
 (a) the values in the registers specified in the instruction codes of a JMP instruction and a JL instruction serve as branch destination addresses (however, the low-order 2 bits "00" in the registers are ignored),
 (b) a BRA instruction, a BL instruction, a BC instruction, and a BNC instruction specify 8-bit or 24-bit immediate values, and
 (c) a BEQ instruction, a BNE instruction, a BEQZ instruction, a BNEZ instruction, a BLTZ instruction, a BGEZ instruction, a BLEZ instruction, and a BGTZ instruction specify 16-bit immediate values.

The branch destination address in (b) and (c) is assumed to equal the PC value of the branch instruction plus the code-expanded immediate value shifted 2 bits leftwardly (toward the MSB position). For addition, the low-order 2 bits of the PC value are "00".

As above described, specifying the branch destination only on the 32-bit boundary allows the low-order 2 bits of the branch destination address to be constantly "00". This eliminates the need to specify the low-order 2 bits of the branch destination address when the branch destination address is specified in the instruction code. As a result, the range of addresses to which a direct branch is caused from within the instruction code is increased by $2^2$ times, or four times. In this preferred embodiment, since an address specifying part within the instruction code is a maximum of 24 bits as shown in the above-mentioned instruction code table, the direct branch may be caused from the address of the instruction being executed to a range of ±32 megabytes.

III. Control of Decoding Sequence of Instruction

In the processor 10, the predetermined number of bits of the information indicative of an instruction format identifier in the instruction code is one in this preferred embodiment. The sequence of decoding and execution of instructions is controlled depending on the value of the instruction format identifier. The MSB (most significant bit) of each instruction code corresponds to the instruction format identifier.

The rules of control using the instruction format identifier are established in a manner to be described below. The MSB of a single 32-bit instruction code is constantly set to "1". When the instruction code consists of two 16-bit instruction codes, the MSB of the high-order 16-bit instruction code is constantly "0", and the processing of the low-order 16-bit instruction code differs depending upon the value of the MSB thereof.

Figure 11:
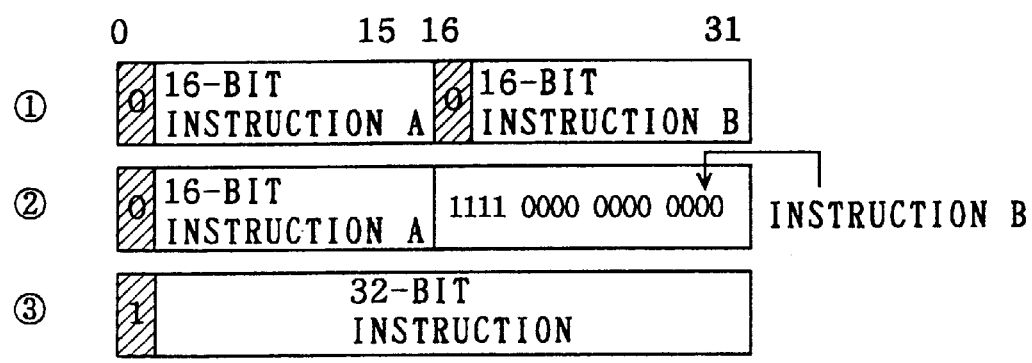
FIG. 11 illustrates a method of controlling the execution sequence of the instruction codes.

A method of controlling the execution sequence of instructions is described with reference to FIG. 11. Referring to FIG. 11, (1) if the MSB of an instruction B is "0", an instruction A and the instruction B are executed in succession.

On the other hand, (2) if the MSB of the instruction B is "1", only the instruction A is executed but the instruction B is not executed. More specifically, when a "NOP instruction" for word alignment control is inserted as the instruction B for word alignment control based on the restriction of the instruction code arrangement of the 32-bit instruction, an assembler automatically sets the MSB of the instruction code corresponding to the "NOP instruction" to "1" to thereby permit the execution of only the instruction A. The "NOP instruction" for ordinary no-operation is "0111000000000000". However, the "NOP instruction" is inserted in the position of the low-order 16 bits within the 32-bit word boundaries for the above described purpose of alignment, and need not be directly executed. Thus, the "NOP instruction" inserted for the purpose of alignment is "1111000000000000" and is not executed in the processor 10.

Such instruction execution sequence control is advantageous in eliminating the execution time penalty of the "NOP instruction" for no-operation inserted to satisfy the code arrangement.

V. Instruction Decoding Method and Control Portion Therefor

A specific method of controlling the instruction decoding is described with reference to FIG. 12.

Construction of Instruction Decode Portion 7

The instruction decode portion 7 comprises an instruction decode input latch 7a, an instruction decoder 7c, a constant generator 7d, and a control logic 7b for the instruction decode portion 7. Among these elements, the control logic 7b controls the respective elements of the instruction decode portion 7. The instruction decoder 7c receives an effective instruction code in 32-bit patterns stored in the instruction decode input latch 7a to decode the instruction code. The arrangement of the instruction codes in the instruction decode input latch 7a is similar to that of the instruction codes in the memory 12. The result of decoding is outputted to the control portion 8 of the processor 10. The control portion 8 controls the arithmetic portion 1 and the entire processor 10 on the basis of the result of decoding.

The detailed operations of the respective portions are discussed below.

Instruction Fetch Portion 6

The instruction fetch portion 6 fetches the instruction code data signal in units of 32 bits from the memory 12 through the data bus 15 (FIG. 1) to store the instruction code data signals in the instruction queue portion 5. The instruction fetch portion 6 sequentially reads the instruction code data signals from the instruction queue portion 5 to transfer the read instruction code data signals to the instruction decode portion 7 in response to a fifth control signal CB to be described below. Consequently, the transferred instruction code data signals are stored in the instruction decode input latch 7a which is 32 bits wide.

The control logic 7b controls the execution of the decoding of a signal indicative of an effective instruction code among the instruction code data signals stored in the instruction decode input latch 7a on the basis of the above described instruction format identifier in a manner to be described below.

Control Logic 7b

FIG. 13 illustrates the relationship between first to third control signals CT1 to CT3 (also referred to as input signals) of FIG. 12 and the arrangement of effective codes in the instruction decode input latch 7a. The diagonally shaded portions of FIG. 13 indicate instruction format identifiers, and the dot-shaded portions of FIG. 13 indicate effective codes.

As illustrated in FIG. 12, inputs to the control logic 7b are the first and second control signals CT1 and CT2 indicative of an instruction length identifier in the 32-bit patterns stored in the instruction decode input latch 7a, and the third control signal CT3 outputted from the control logic 7b itself. Specifically, the instruction decode input latch 7a provides the values of the zeroth and sixteenth bits of the 32-bit pattern held therein as the instruction format identifier as the first and second control signals CT1 and CT2, respectively, to the control logic 7b. The third control signal CT3 is an output signal from the control logic 7b. In response to a decode end signal ES outputted from the instruction decoder 7c, the third control signal CT3, when it is "0", indicates that the bits 0 to 15 in the 32-bit pattern stored in the latch 7a are being decoded, and when it is "1", indicates that the bits 16 to 31 are currently being decoded.

(α) When the value of the first control signal CT1 is "1", the instruction code data signal stored in the instruction decode input latch 7a indicates the 32-bit instruction.

(β) When the first control signal CT1 is "0", the instruction code data signal comprised of two 16-bit instructions is stored in the instruction decode input latch 7a. Then, when the second control signal CT2 is "0" and the third control signal CT3 is "0", the effective instruction code is located in the position of the high-order 16 bits. When the second control signal CT2 is "0" and the third control signal CT3 is "1", the effective instruction code is located in the position of the low-order 16 bits.

(γ) When the first control signal CT1 is "0" and the second control signal CT2 is "1", only the high-order 16-bit instruction code is the effective code, and the low-order 16-bit instruction code is the above described "NOP" instruction for word alignment control which is not executed.

The control logic 7b outputs three control signals CA, CB, and CT3 on the basis of the input signals CT1 to CT3 for decoding of the next code. The fourth control signal CA is a control signal, or a shifter control signal, for shifting the low-order 16-bit instruction code to the position of the high-order 16 bits in the instruction decode input latch 7a. The fifth control signal CB is a pointer of the 32-bit boundary of the instruction address, and instructs the instruction fetch portion 6 to start transferring the instruction code to the instruction decode input latch 7a. The third control signal CT3 is the signal indicating whether the next effective code is located in the position of the high-order 16 bits or in the position of the low-order 16 bits within the 32-bit word boundaries as above discussed.

With continued reference to FIG. 12, the control logic 7b provides a sixth control signal CC to a bit 30 portion of a PC (PC30 portion) to be described below. The sixth control signal CC is "1" when the address of the instruction code being decoded in the instruction decoder 7c is positioned on the 32-bit word boundary, and is "0" when it is not.

For decoding branch instructions for specifying the branch destination addresses using the immediate value in the instruction code, that is, (b) the BRA instruction and (c) the BEQ instruction and the like, the latch 7a outputs the immediate value to the constant generator 7d connected to the position of low-order 24 bits (bits 8 to 31) of the instruction decode input latch 7a. The constant generator 7d outputs the code-extended immediate value to the bus S2.

If a branch is caused during the execution of an instruction, the fourth control signal CA, the fifth control signal CB, the sixth control signal CC, and the third control signal CT3 of the instruction decode portion 7 are initialized independently of the values of the first to third control signals (input signals) CT1 to CT3.

FIG. 14 illustrates the relationship between the control signals (inputs) and the control signals (outputs).

In the instruction decode portion 7 (FIGS. 1 and 12), the instruction code to be decoded first always starts at the top of the instruction decode input latch 7a in any case. Thus, the contents of the instruction decode input latch 7a are intactly transferred to the instruction decoder 7c. If the instruction code data signal is the single 32-bit instruction code, the transfer paths are the paths P2 and P3 shown in FIG. 12. The transfer path of the high-order 16-bit instruction code is the path P2.

Second output of the instruction code to the instruction decoder 7c is performed only when the instruction code in the instruction decode input latch 7a contains the 16-bit instruction to be sequentially executed. In this case, processing to be described below is performed prior to second output of the instruction code to the instruction decoder 7c. Since the instruction code to be decoded, or the effective code, is located in the position of the low-order 16 bits within the 32-bit word boundaries, the contents of the instruction decode input latch 7a are shifted 16 bits leftwardly (toward the zeroth bit of the 32-bit pattern) (the path P1) into the instruction code input latch 7a. The result is the second output to the instruction decoder 7c (the path P2).

In this manner, the instruction code passes through the path P1 only when the effective code is located in the position of the low-order 16 bits of the instruction decode input latch 7a. This reduces the amount of hardware to achieve higher-speed operation.

VI. Incrementing of PC Portion 3

Figure 15:
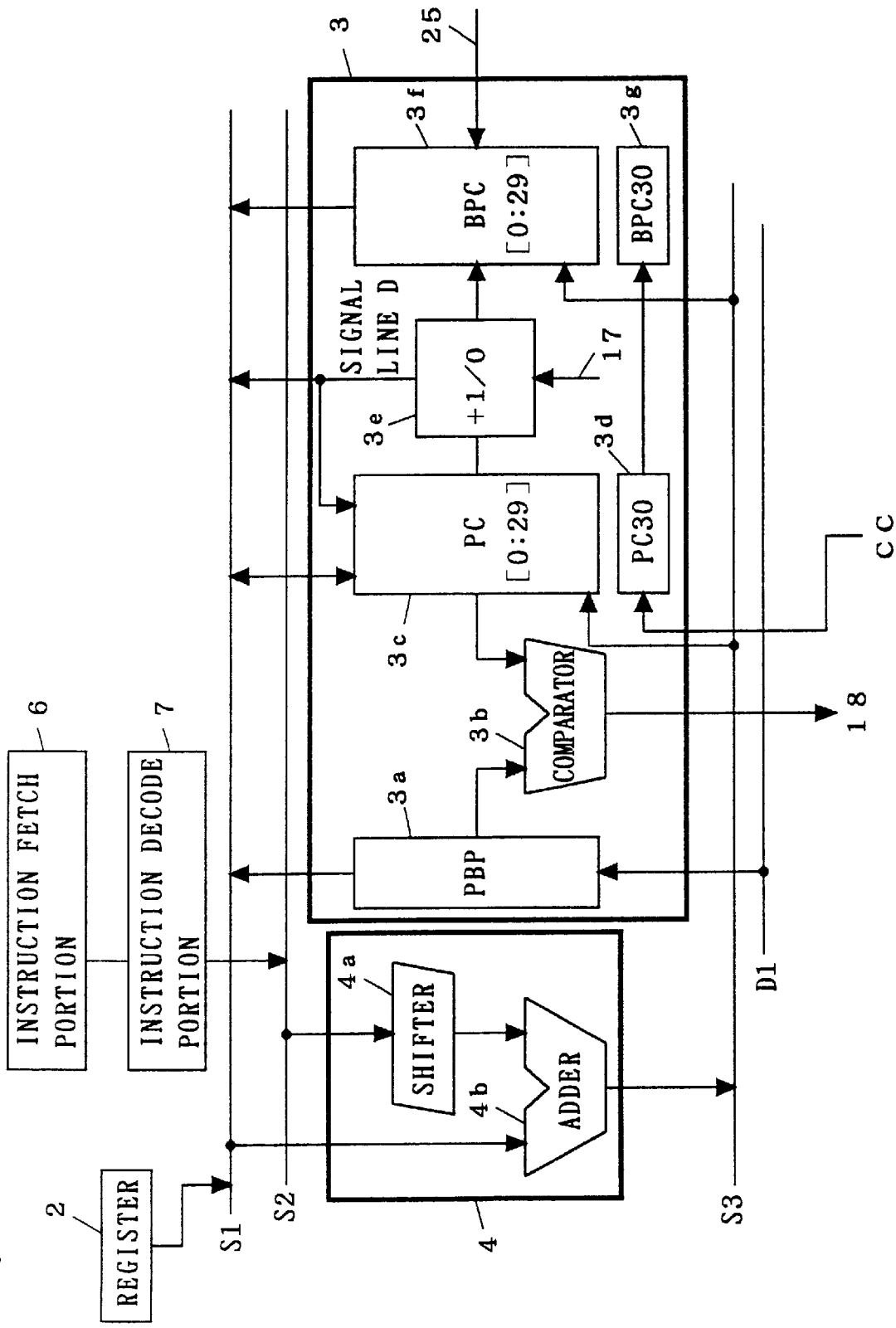
FIG. 15 is a detailed block diagram of a construction of a PC portion and an address generator.

FIG. 15 is an enlarged block diagram of parts of the PC portion 3 and address generator 4 of FIG. 1. Incrementing of the PC portion 3 will be discussed with reference to FIG. 15.

The address generator 4 comprises a shifter 4a and an adder 4b and calculates the address of the branch instruction in accordance with an addressing mode.

The PC portion 3 comprises a program counter (referred to hereinafter as a PC) as the nucleus, a comparator 3b, a (+1/0) portion 3e, a backup program counter [0:29] (referred to hereinafter as a BPC[0:29]) 3f, a BPC30 portion 3g, and a program counter break pointer (referred to hereinafter as a PBP) 3a. The PBP 3a and the BPC[0:29] 3f are control registers.

Figure 22:
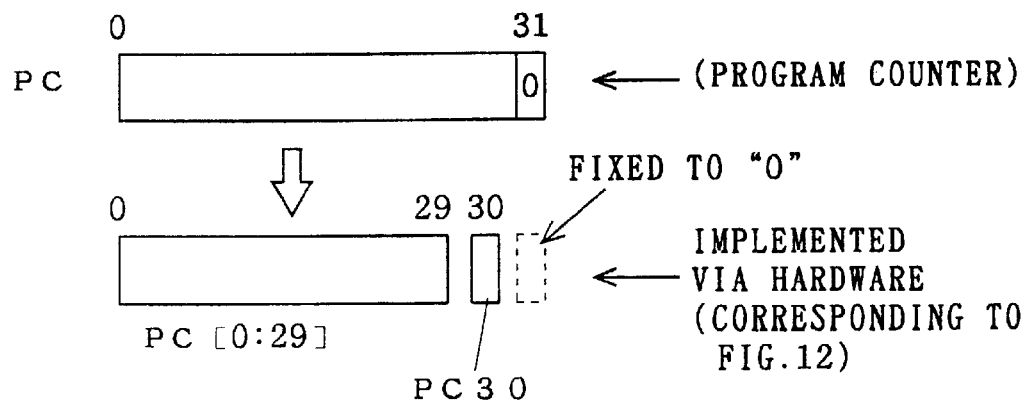
FIG. 22 illustrates a PC implemented via hardware.

The program counter is a 32-bit counter for holding the address of the instruction being currently executed. The above-mentioned restriction of the method of locating the instruction codes causes the instructions of the processor 10 (FIG. 1) to start only at even-numbered addresses. Then, the bit 31 of the program counter is fixed to "0" as illustrated in FIG. 22. Since the value of the bit 31 of the PC need not be implemented via hardware, the PC is implemented by a PC[0:29] 3c indicative of the values of the bits 0 to 29 and a PC30 portion 3d indicative of the value of the bit 30 as illustrated in FIG. 15. The PC30 portion 3d is a register for holding the value "0" or "1" of the sixth control signal CC.

Figure 23:
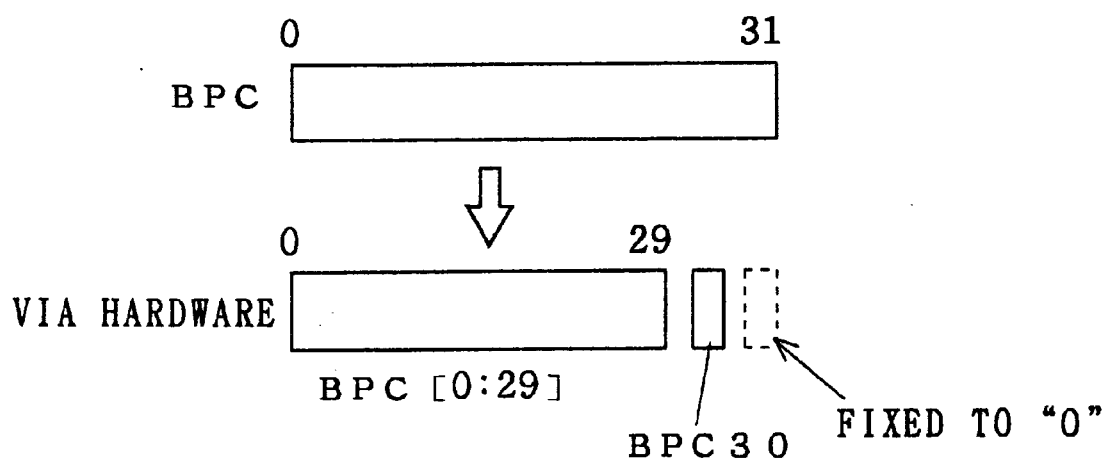
FIG. 23 illustrates a BPC implemented via hardware.

The BPC saves the PC value held in the PC 3c when an interrupt or a trap to be described later occurs. As illustrated in FIG. 23, since the bit 31 of the BPC is constantly fixed to "0", the BPC is implemented via hardware by the BPC[0:29] 3f indicative of the values of the bits 0 to 29 and the BPC30 portion 3g indicative of the value of the bit 30. The processor 10 (FIG. 1) saves the values of the PC[0:29] 3c in the BPC[0:29] 3f upon detection of an interrupt or a trap to be described later. The PBP 3a is a control register which is 32 bits in width for controlling a PC break interrupt to be described later. The PBP 3a previously holds the address for execution of the instruction which starts the interrupt, and writes the address by using a write instruction signal on a bus D1 from the control portion 8 (FIG. 1).

The PC[0:29] 3c is updated in a manner to be described below when an instruction other than the branch instruction is executed in the processor 10 (FIG. 1). In this preferred embodiment, four buses S1, S2, S3 and D1 are used, and a signal line D is connected to the PC[0:29] 3c.

When the fifth control signal CB (the pointer indicating the address of the 32-bit word boundary) outputted from the control logic 7b of the instruction decode portion 7 of FIG. 12 is updated, the (+1/0) portion 3e increments the value held in the PC[0:29] 3c by +1, and the incremented value is placed on the signal line D. When the fifth control signal CB is not updated, the value held in the PC[0:29] 3c is not incremented by the (+1/0) portion 3e but is intactly placed on the signal line D.

The value on the signal line D is written into the PC[0:29] 3c. This causes the PC value in the PC[0:29] 3c to be re-written to the value of the PC[0:29] 3c of the next instruction. Since the signal line D is connected to the bus S1, the updated value of the PC[0:29] 3c may be called onto the bus S1.

The six control signal CC outputted from the control logic 7b (FIG. 1) of the instruction decode portion 7 is written into the PC30 portion 3d when the instruction is executed.

If a branch occurs during the execution of the instruction, the PC value of the next instruction is produced using the address generator 4, and the produced value is written into the PC[0:29] 3c via the bus S3.

For the branch instructions which specify the jump destination address by using the immediate value (the above described branch instructions (b) and (c)), the constant generator 7d (FIG. 1) of the instruction decode portion 7 expands the immediate value extracted from the instruction code to 32 bits to output the expanded immediate value to the address generator 4 via the bus S2. The code-expanded immediate value is shifted 2 bits leftwardly (toward the MSB) by the shifter 4a of the address generator 4. The updated value in the PC[0:29] 3c is outputted from the signal line D via the bus S1 to the address generator 4. The updated value in the PC[0:29] 3c corresponds to the PC high-order 30 bits of the branch instruction. The adder 4b calculates the sum of the updated value in the PC[0:29] 3c and the code-expanded immediate value shifted 2 bits leftwardly. This provides the high-order 30 bits of the branch destination address. The high-order 30 bits are written into the PC[0:29] 3c via the bus S3.

For the branch instructions which specify the jump destination address by using the register 2 (FIG. 1) (the above described branch instructions (a)), the PC 3 receives the value held in the register 2 specified by the instruction code through the bus S1, and the constant value is written into the PC[0:29] 3c.

If a branch occurs, the instruction decode portion 7 initializes the sixth control signal CC to "0", causing the PC30 portion 3d to be written with "0". Thus, the branch destination address is specified only on the 32-bit word boundary in the processor 10 (FIG. 1) as above discussed.

VII. Interrupt and Trap

If an event occurs during the execution of a normal program by the processor 10 (FIG. 1), a need arises to suspend the execution of the program to execute another program. Such an event is roughly divided into an interrupt and a trap.

(a) Interrupt

An interrupt is an event which is caused by an external hardware signal (referred to as an interrupt request signal) or a PC break signal produced during the execution of a specific address.

(b) Trap

A trap is an event which is caused by an instruction.

The processor 10 (FIG. 1) has the function of implementing two interrupts including an external interrupt (EI) and a PC break interrupt (PBI), and one trap (TRAP).

Figure 16:
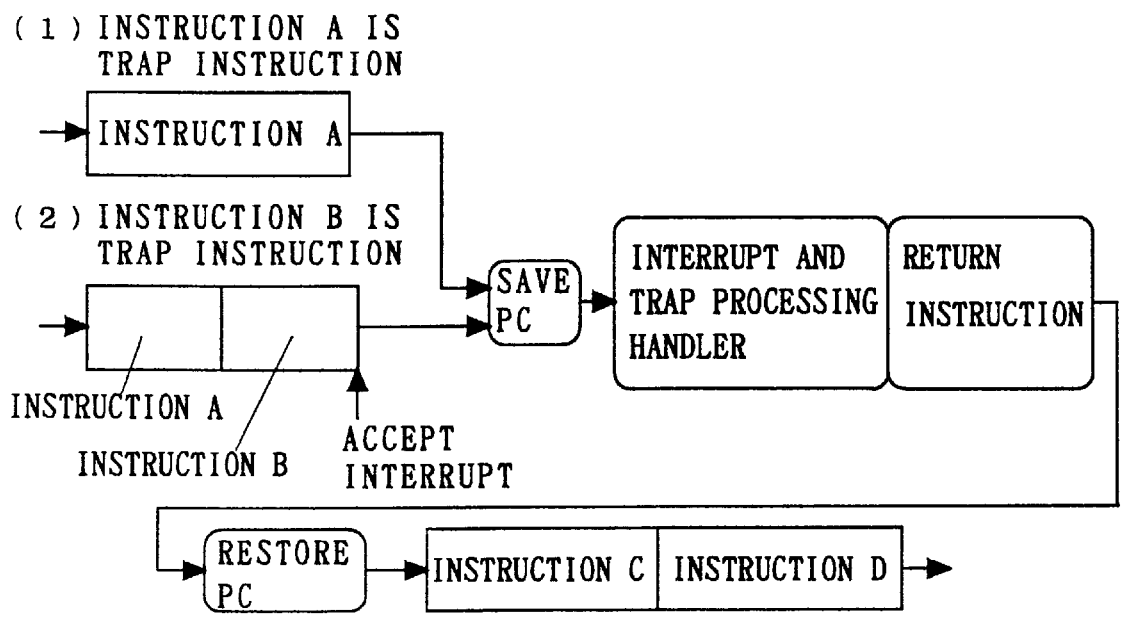
FIG. 16 illustrates a procedure of processing when an interrupt and a trap occur.

The procedure of processing when the interrupt and trap occur is generally described with reference to FIG. 16.

When the interrupt request signal or the PC break signal becomes effective, the processor 10 accepts the interrupt only on the 32-bit word boundary as will be described in detail later. The trap instruction starts trap processing after the interrupt instruction is executed.

This permits the processor 10 (FIG. 1) to suspend the execution of the program to perform the interrupt or trap processing. Then, the processor 10 detects the interrupt or trap event to save the PC value of the PC[0:29] 3c of FIG. 15 in the BPC[0:29] 3f, which is described later, and thereafter causes a branch to a processing program "interrupt and trap processing handler" corresponding to the interrupts or trap.

Upon completion of the processing of the "interrupt and trap processing handler", the processor 10 executes a return instruction from the "interrupt and trap processing handler", and the PC value of the PC[0:29] 3c is restored. The processor 10 is returned from the interrupt and trap processing.

The interrupt and trap processing of the processor 10 includes processing performed by hardware and processing performed by programs. More specifically, hardware in the processor 10 executes (1) saving of the PC value having the return destination address in the BPC[0:29] 3f, (2) branch to the "interrupt and trap processing handler", and (3) writing of the BPC value into the PC[0:29] 3c.

The external interrupt (EI) is caused by the external hardware signal (interrupt request signal). The interrupt request by the interrupt request signal is accepted only on the 32-bit word boundary (this mechanism is achieved by the structure of a detecting circuit to be described later). The value saved in the BPC[0:29] 3f of FIG. 15 when the interrupt occurs is the PC value of the next instruction.

The PC break interrupt (PBI) occurs when a specific address is executed. In the processor 10 (FIG. 1), the addresses are specified only on the 32-bit word boundary. The comparator 3b of FIG. 15 compares the value held in the PBP 3a with the value of the PC[0:29] 3c for each cycle, and outputs a PC break signal 18 when a match occurs therebetween. The PC break signal 18 is detected through an interrupt and trap detecting circuit to be described later as an interrupt and trap detection signal which in turn is outputted to the (+1/0) portion 3e of FIG. 15. As a result, an interrupt occurs in the processor 10, and the PC value is saved. As above described, the PBP 3a is written using the data bus D1. The value saved in the BPC[0:29] 3f when the interrupt occurs is the PC value of the next instruction.

The trap which is an interrupt controlled by software is caused by the execution of the trap instruction. Information indicating whether the trap instruction is located in the position of the high-order 16 bits or in the position of the low-order 16 bits within the 32-bit word boundaries is stored in the bit 30 of the BPC, or the BPC30 portion 3g. The value in the BPC30 portion 3g is "0" if the trap instruction is located in the position of the high-order 16 bits, and is "1" if the trap instruction is located in the position of the low-order 16 bits. The value saved in the BPC when the interrupt occurs is the PC value of the trap instruction plus 4.

Figure 17:
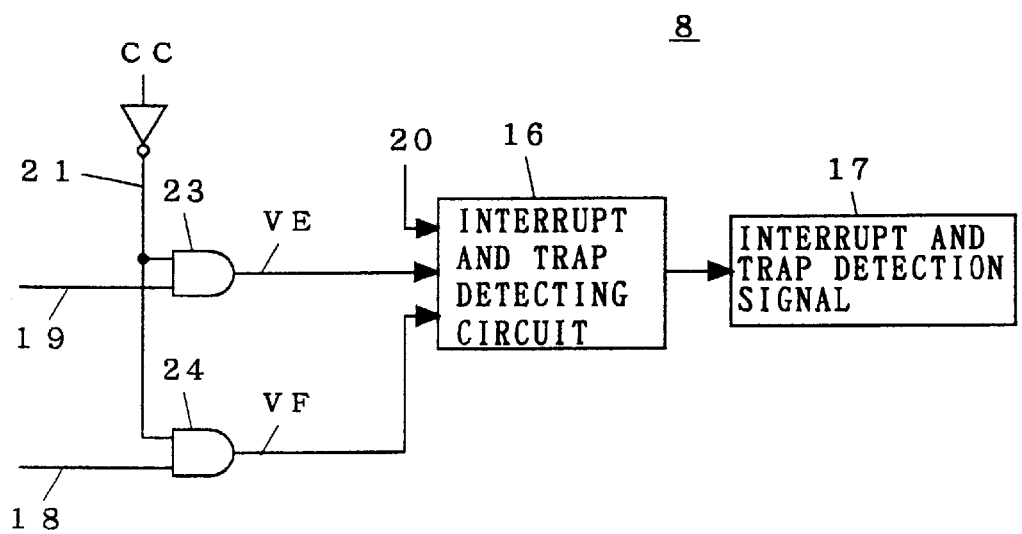
FIG. 17 is a block diagram of a circuit for detecting the interrupt and the trap.
Figure 18:
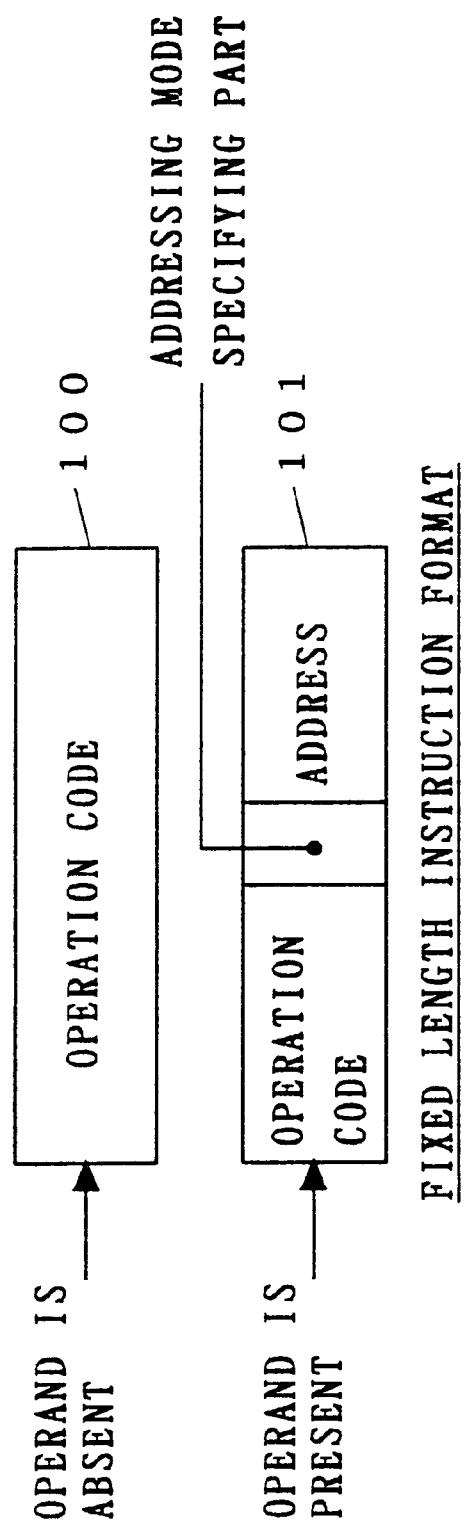
FIG. 18 illustrates a conventional fixed length instruction format.
Figure 19:
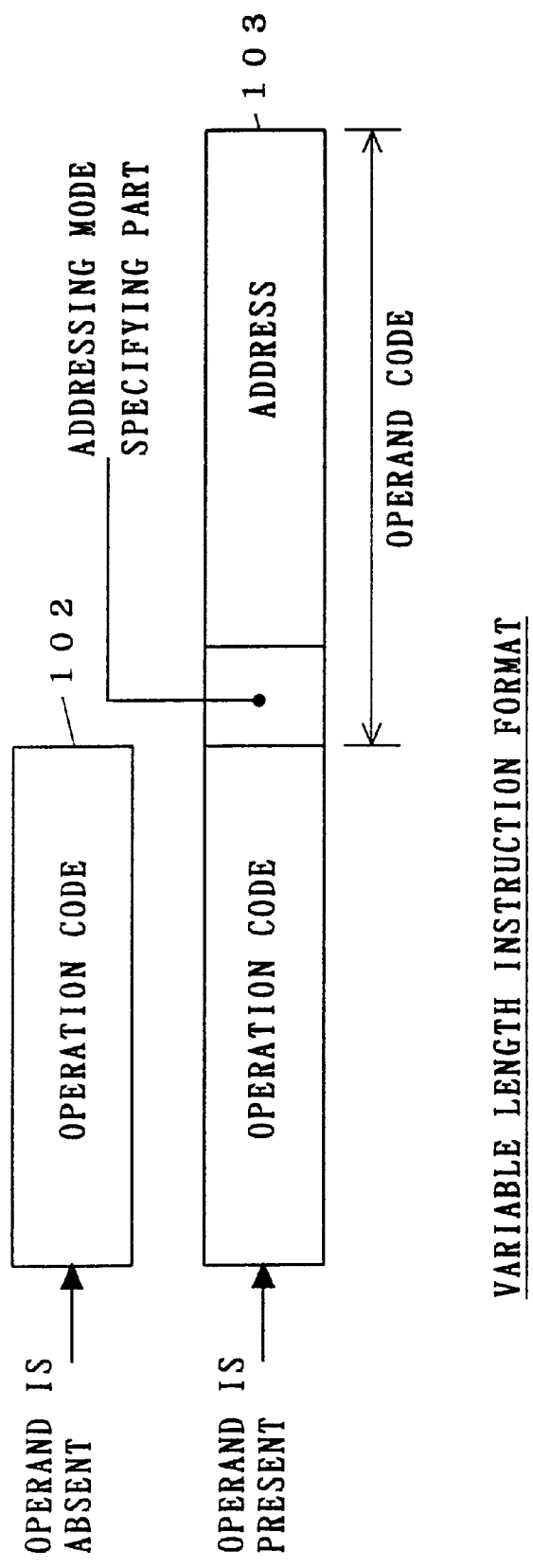
FIG. 19 illustrates a conventional variable length instruction format.
Figure 20:
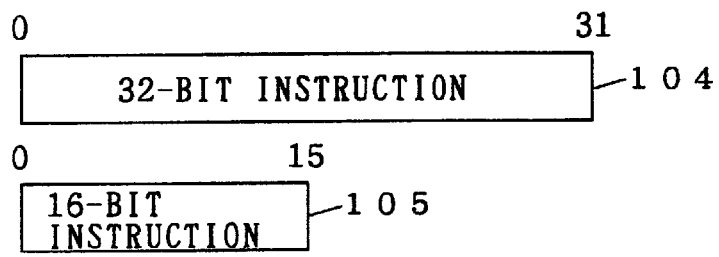
FIG. 20 illustrates a specific form of the conventional variable length instruction format.
Figure 21:
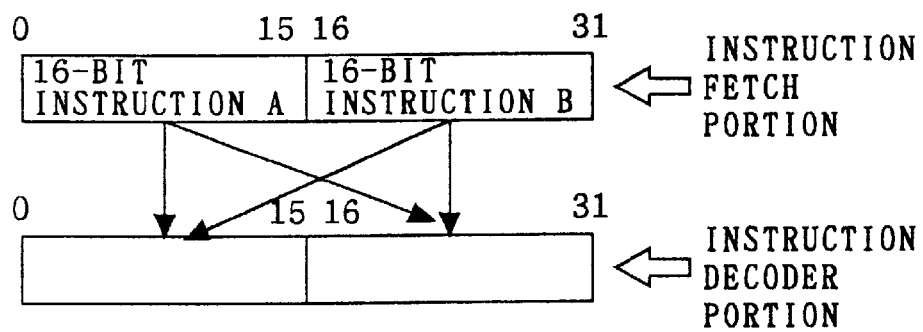
FIG. 21 illustrates conventional transfer paths between an instruction fetch portion and an instruction decoder portion.

FIG. 17 illustrates a circuit for detecting the interrupts and trap. The detecting circuit of FIG. 17 constitutes a part of the control portion 8 of FIG. 1, and comprises an inverter 22, AND circuits 23, 24 and an interrupt and trap detecting circuit 16.

The detecting circuit of the processor 10 accepts the interrupt request caused by an external signal 19 and the interrupt request caused by the PC break signal 18 only on the 32-bit word boundary. Since the level of the sixth control signal CC is "0" on the 32-bit word boundary, an output signal VE is effective ("1") only when a word boundary detection signal 21 (at the level "1") which is the inverse of the sixth control signal CC and the interrupt request signal 19 are simultaneously effective ("1"). An output signal VF is effective only when the word boundary detection signal 21 and the PC break signal 18 are simultaneously effective ("1"). In this manner, the interrupt request is accepted on the 32-bit word boundary, and the branch is caused to the interrupt and trap processing handler for the interrupt and trap processing. Thereafter, the return instruction from the "interrupt and trap processing handler" is executed to permit the return from the interrupt and trap processing to the running program.

When the trap instruction gives directions for interrupts, a trap request signal 20 becomes effective ("1").

The interrupt and trap detecting circuit 16 outputs an interrupt and trap detection signal 17 when one of the trap request signal 20, the output signal VE, and the output signal VF is effective ("1"). When the interrupt and trap detection signal 17 is outputted, the branch is caused to the interrupt and trap processing handler and the interrupt and trap processing is performed. Thereafter the return instruction is executed to permit the return from the interrupt and trap processing to the running program.

As described hereinabove, the value of the PC[0:29] 3c (FIG. 15) is saved in the BPC[0:29] 3f when the interrupt or trap occurs. The PC value of the next instruction is written into the BPC[0:29] 3f when the interrupt occurs.

For example, if an interrupt occurs immediately after the execution of the branch instruction, the PC value produced by the address generator 4 of FIG. 15 and indicating the branch designation is written into the BPC[0:29] 3f via the bus S3 under the control of the control portion 8. If an interrupt occurs immediately after the execution of an instruction other than the branch instruction, on the other hand, the output from the PC[0:29] 3c plus one which is given by the (+1/0) portion 3e is written into the BPC[0:.29] 3f.

The value of the PC30 portion 3d is written into the BPC30 portion 3g. In the processor 10 (FIG. 1), since the interrupt is accepted only on the 32-bit word boundary as described hereinabove, the value "0" is constantly saved in the BPC30 portion 3g when the interrupt occurs.

The PC value of the trap instruction plus 4 is written into the BPC when a trap occurs. The output from the PC[0:29] 3c plus one which is given by the (+1/0) portion 3e is written into the BPC[0:29] 3f, and the value of the PC30 portion 3d is written into the BPC30 portion 3g. Specifically, the value "0" is written into the BPC30 portion 3g if the trap instruction which has caused the trap is located in the position of the high-order 16 bits within the 32-bit word boundaries, and the value "1" is written into the BPC30 portion 3g if it is located in the position of the low-order 16 bits.

The return from the interrupt and trap is accomplished by the execution of the return instruction as above described. The return instruction branches to the address indicated by the signal outputted from the BPC[0:29] 3f which has received a signal 25 from the control portion 8. In the processor 10, however, the branch destination address is constantly set to only the 32-bit word boundary. Thus, the low-order 2 bits of the PC are constantly "00" when the BPC[0:29] 3f returns to the PC[0:29] 3c.

Conclusion

The above described construction provides features to be described hereinafter.

The processor 10 according to the present invention executes the instruction codes of two different lengths: the N-bit length and 2N-bit length, to achieve a smaller code size than the fixed length instruction format without being restricted by instruction functions and a simpler instruction decoding method than the background art variable length instruction format.

In particular, inhibiting the arrangement of instructions across the 2N-bit word boundary by imposing the given restrictions on the arrangement of the instruction codes and specifying the branch destination address only on the 2N-bit word boundary may significantly reduce the data transfer paths between the instruction fetch portion 6 and the instruction decode portion 7. The result is the reduction in the amount of hardware for instruction decoding and the increase in operating speed.

The processor 10 limits the branch destination address to the 2N-bit word boundary to provide the low-order 2 bits of the branch destination address which are constantly "00". This eliminates the need to specify the low-order 2 bits of the branch destination address within the instruction code. Consequently, the direct branch may be caused from the address of the instruction being executed to the address range which is $2^2$ times, or four times, wider than that provided when all bits of the address are specified.

The processor 10 having the above described functions may be provided with the functions of supporting various interrupt and trap processings.

While the invention has been described in detail, the foregoing description is in all aspects illustrative and not restrictive. It is understood that numerous other modifications and variations can be devised without departing from the scope of the invention.

We claim:

1. A processor comprising:
   an instruction code input device comprising a memory, said memory comprising a plurality of 2N-bit word boundaries, where N is an integer greater than or equal to 1, and instruction codes consisting of a plurality of N-bit first instructions and at least one 2N-bit second instruction, wherein each 2N-bit word boundary comprises one of two first instructions and a single second instruction;
   instruction fetch means for fetching a content of a 2N-bit word boundary;
   instruction decoding means for receiving and decoding said content, wherein each of said first and second instructions includes an instruction format identifier at a predetermined position within said first and second instructions which identifies whether an instruction is a first or second instruction and indicates an instruction decoding sequence, said instruction decoding means comprising:
   an instruction decode input latch having a length of 2N bits for storing said content;
   an instruction decoder for receiving and decoding a second instruction or at least one first instruction; and a control logic for controlling a transfer of said second instruction or said at least one first instruction from said instruction decode input latch to said instruction decoder based on said instruction format identifier or identifiers associated with said content;

wherein said control logic controls said instruction decode input latch in such a manner that:

when said instruction format identifier indicates that the instruction in said decode input latch is a second instruction, said control logic directly transfers said second instruction from said instruction decode latch to said instruction decoder; and when a first instruction format identifier indicates that two first instructions are stored in said decode input latch and a second instruction format identifier indicates that both first instructions are effective, said control logic transfers one of said two first instructions which is located in a high-order bit position from said instruction decode input latch to said instruction decoder, and then shifts the other first instruction which is located in a low-order bit position to said high-order bit position and transfers said shifted other first instruction from said instruction decode input latch to said instruction decoder.

2. The processor of claim 1 wherein when said first instruction format identifier indicates that two first instructions are stored in said decode input latch and said second instruction format identifier indicates that said other instruction which is located in said low-order bit position is an instruction for word alignment control, said control logic transfers only said one of said two first instructions which is located in a high-order bit position from said instruction decode input latch to said instruction decoder for decoding.

* * * * *